Nov. 9, 1965  G. E. BJÖRKLUND  3,216,366
ROLLING-PISTON MACHINE
Filed Dec. 10, 1962
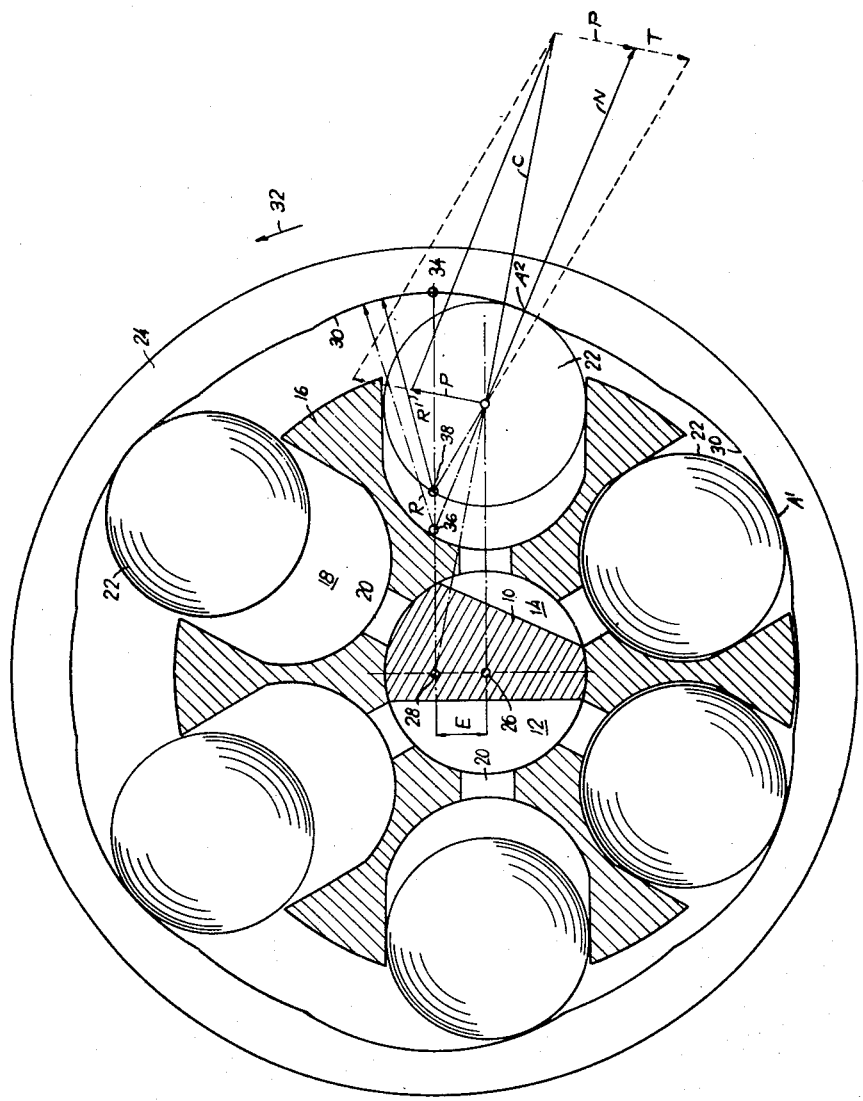
INVENTOR
GUSTAF ERIK BJÖRKLUND
BY Young & Thompson
ATTYS.

United States Patent Office 3,216,366
Patented Nov. 9, 1965

3,216,366
ROLLING-PISTON MACHINE
Gustaf Erik Björklund, Stockholm, Sweden, assignor to Rederiaktiebolaget Soya, Hagersten, Sweden, a corporation of Sweden
Filed Dec. 10, 1962, Ser. No. 243,362
Claims priority, application Sweden, Dec. 14, 1961, 12,509/61
4 Claims. (Cl. 103—161)

This invention relates to piston machines acting as pumps, compressors or motors and in which a rotor having working chambers for pistons in the form of rolling members is centrally mounted on a valve slide or pintle having inlets and outlets, said rotor being surrounded by a rotary ring mounted eccentrically with respect to the valve slide or pintle, said rotary ring having curved roll races for the pistons which act as entraining means such that the rotor and the rotary ring are rotating simultaneously about the valve slide or pintle. A piston machine of the general type referred to above is described in my U.S. patent application 820,233, filed June 15, 1959, now Patent No. 3,106,167. The pistons may be in the form of balls which upon rotation of the rotor and rotary ring about their respective centers are moving outward and inward in the working chambers of the rotor which chambers are in the form of cylinder bores. Due to the eccentricity between the rotary ring and the rotor, the pistons are rolling a short distance to and fro on the surrounding rotary ring in addition to their outward and inward working movements. The roll races of the rotary ring are devised such that the rolling members are able to act as entraining means. During the rotation, pressures and frictional forces acting between each piston and the lateral wall of the working chamber are likely to assume high values at high speeds. At high speeds the action of the working medium upon the piston is generally of secondary importance as compared with the centrifugal and tangential forces acting upon the piston. Assuming that the rotor and rotary ring are moving synchronously and at constant angular speed, each rolling member (piston) while rolling a short distance on its curved roll race during rotation has to be accelerated during a half a revolution and retarded during the other half of revolution. Consequently, the piston will be forced at a varying pressure against the leading or trailing wall of the cylinder bore while moving outward and inward therein. Consequently, the frictional forces may assume high values resulting in a reduction of the efficiency of the machine and causing wear of the movable parts.

The object of this invention is to eliminate the above named inconveniences by improving the shape of the roll races for the pistons on the rotary ring. In accordance with the invention and radius of curvature of each roll race is adapted such that the component of the centrifugal force directed tangentially of the rotary ring and acting on the corresponding rolling member during rotation of the rotor assist in accelerating and retarding the rolling member so as to reduce the friction between the rolling member and the walls of the working chamber. In other words, it is possible in accordance with the invention by suitable choice of the radius of curvature of the roll races entirely or partly to meet the power required for acceleration and retardation of the rolling members. Consequently, the forces which otherwise would be transmitted between the wall of the working chamber and the rolling member for acceleration and retardation of the rolling member can be minimized or entirely eliminated.

Since each rolling member while moving to and fro along the associated roll race also rotates about its own center, forces depending on this rotation will be added. Even these inertia forces can be taken care of by a suitable shape of the roll races. In order to reduce the inertia forces it is also possible to make the masses of the rolling members as small as possible, for instance, by making the rolling members hollow and/or from a material of low specific gravity.

In a machine devised in accordance with the invention the forces and, consequently, the friction, between the rolling members and the cylinder bore are considerably reduced and in addition, the life and the efficiency of the machine are increased.

An embodiment of the invention is described with reference to the annexed drawing which illustrates a cross-sectional view of a rolling-piston machine in accordance with the invention, only the main parts of the machine being illustrated.

Referring to the drawing, reference numeral 10 denotes the central valve slide of the machine, said slide having ducts 12 and 14 for the supply and discharge of the working medium. Numeral 16 denotes the rotor having working chambers 18 and radial ducts serving as inlets and outlets for the working medium, and numeral 22 denotes the ball-shaped pistons which fit in the working chambers 18 and are intended to move outward and inward therein. A surrounding rotary ring 24 is mounted eccentrically with respect to the valve slide 10, the center of the valve slide being denoted at 26 and the center of the rotary ring at 28. The eccentricity is indicated at E. The inner surface of the rotary ring 24 is in the form of curved roll races 30, on which the rolling members 22 are rolling to and fro during each revolution of the rotor and the rotary ring due to the eccentricity E. As a result of the engagement between the rolling members 22 and the roll races 30, the rotor 16 will be rotated upon rotation of the rotary ring 24, or vice versa. In the drawing the direction of rotation is indicated by an arrow 32.

Due to the eccentricity the rolling members are rolling to and fro along the roll races 30 during each revolution. Consequently, a rolling member 22 which assumes a position comparatively deep in the roll race at a point $A^1$, as shown in the lower right-hand part of the drawing, will later be located at a point $A^2$ at the trailing end of the roll race in the position shown farthest to the right in the drawing. It will be apparent that the rolling member has been retarded and, as a result thereof, would exert a pressure on the trailing wall of the working chamber. This effect is compensated by a suitable design of the roll race. The action of the forces appears from the vector diagram plotted for the rolling member located farthest to the right in the drawing. In this diagram, C denotes the centrifugal force directed from the axis 28 of the rotary ring 24, N denotes the pressure exerted by the rolling member at right angles to the roll race at the point $A^2$ and P denotes the centrifugal force component directed tangentially of the rotor ring. This component may be considered as occasioned by the fact that the roll race is inclined outward toward the periphery of the rotary ring from the point $A^2$ at which the rolling member bears on the rotary ring, the centrifugal force acting to move the rolling member forward in the direction of the tangent so as to reduce the pressure on the trailing wall of the working chamber. The center of curvature 36 of the roll race 30 would be the intersectional point between the elongation of the vector N and the connecting line between the center 28 of the rotary ring and the central point 34 of the roll race.

In the above description no consideration has been paid to the rotation of the rolling member about its own center and to the inertia forces caused thereby. These forces can be compensated for by decreasing the radius of curvature of the roll race 30 and are represented in the diagram by the vector T. As shown in the drawing, the center of curvature will be located at the point 38. In this case, the radius of curvature $R^1$ is less than the radius of curvature R which is obtained if no consideration is paid to the inertia forces T.

The roll races can be formed very accurately and by simple means and their dimensions are independent of the masses of the rolling members at given dimensions thereof. The forces acting on the rolling members may be further reduced by using lightweight rolling members. This may be realized by using rolling members of a material of low specific gravity or by hollow rolling members. It is also conceivable to use hollow roller having their axes parallel to the axes of rotation of the machine instead of balls in which case the working chambers have to be shaped accordingly so as to be substantially rectangular in cross-section. The balls or rollers may be in the form of thin shells which serve as wear surfaces and may be filled with a suitable medium to obtain the required load-carrying capacity. Accordingly as the rolling members can be made lighter the requirement for an ideal shape of the roll races of the rotary ring is decreased. However, the effect which can be obtained by using lightweight rolling members is insignificant at high speeds as compared with the effect obtained by an optimum shape of the roll races.

What is claimed is:

1. A rolling-piston machine comprising a pintle formed with valve openings for a working medium, a rotor rotatably slidable on said pintle in central relation thereto, said rotor having a plurality of working chambers arranged for successive communication with said valve openings, rolling pistons mounted in said working chambers respectively for reciprocation therein, a ring surrounding said rotor and rotatable about an axis disposed eccentrically with respect to said pintle with its inner circumference in contact with said rolling pistons, said ring being formed at its inner circumference with curved roll races in contact with the rolling pistons each at one point and formed as locking surfaces for enabling entrainment between the ring and the rotor by way of the rolling pistons, the radius of curvature of each roll race at said points of contact between the pistons and said roll races being substantially less than the distance between said roll races and the center of said ring so that the inclination of the roll race at said points of contact varies in magnitude and direction with the centrifugal force that acts to accelerate and retard the piston thereby to reduce the friction between the piston and the walls of its corresponding working chamber during rotation of the rotor and the ring on the pintle.

2. A machine according to claim 1, wherein said radius of curvature also depends upon the inertia forces induced by the rotation of each rolling piston about its own center.

3. A machine according to claim 1, wherein said rolling pistons are hollow so as to reduce the mass of said pistons.

4. A machine according to claim 1, wherein said rolling pistons are formed by a material having a low specific gravity so as to reduce the mass of said pistons.

References Cited by the Examiner

UNITED STATES PATENTS

| | | | |
|---|---|---|---|
| 1,502,310 | 7/24 | Magie et al. | 103—161 |
| 2,392,754 | 1/46 | Mercier | 103—161 |
| 2,725,013 | 11/55 | Vlachos | 103—136 |
| 2,882,831 | 4/59 | Dannevig | 103—161 |
| 3,037,488 | 6/62 | Barrett | 103—161 |

FOREIGN PATENTS

| | | |
|---|---|---|
| 953,223 | 11/56 | Germany. |
| 578,392 | 6/46 | Great Britain. |

LAURENCE V. EFNER, *Primary Examiner.*